United States Patent [19]

Sakurai et al.

[11] 4,086,762
[45] May 2, 1978

[54] EXHAUST REACTION APPARATUS FOR MULTI-CYLINDER INTERNAL COMBUSTION ENGINE

[75] Inventors: Yoshitoshi Sakurai; Ikuo Kajitani, both of Niiza, Japan

[73] Assignee: Honda Giken Kogyo Kabushiki Kaisha, Tokyo, Japan

[21] Appl. No.: 768,571

[22] Filed: Feb. 14, 1977

Related U.S. Application Data

[63] Continuation of Ser. No. 631,046, Nov. 12, 1975, abandoned.

[30] Foreign Application Priority Data

Nov. 14, 1974 Japan ............................... 49-130486

[51] Int. Cl.² .............................................. F01N 3/10
[52] U.S. Cl. ......................................... 60/282; 60/323
[58] Field of Search ........................ 60/282, 302, 323; 123/32 ST, 122 R, 122 AA, 122 AB, 122 AC

[56] References Cited

U.S. PATENT DOCUMENTS

| | | | |
|---|---|---|---|
| 2,257,631 | 9/1941 | Wahlberg | 60/323 |
| 3,302,394 | 2/1967 | Pahnke | 60/282 |
| 3,633,368 | 1/1972 | Rosenlund | 60/282 |
| 3,692,006 | 9/1972 | Miller | 60/314 |
| 3,695,238 | 10/1972 | Beerma | 60/314 |
| 3,916,850 | 11/1975 | Date | 123/32 ST |

Primary Examiner—Douglas Hart
Attorney, Agent, or Firm—Lyon & Lyon

[57] ABSTRACT

Separate exhaust pipes each receive exhaust gases from a plurality of cylinders of an internal combustion engine. The exhaust pipes merge into a common outlet delivering exhaust gases into a first reaction chamber and then into a second reaction chamber enclosing the first reaction chamber. The second reaction chamber also encloses the exhaust pipes and outlet. The cross section areas of the exhaust pipes, outlet and continuing passageway through the first reaction chamber are substantially the same in effective cross section area to avoid temperature drop in the exhaust gases due to expansion. Oxygen-rich exhaust gases from the engine are held at a high temperature for long residence time to oxidize HC and CO and thereby minimize the quantity of these pollutants discharged into the atmosphere.

5 Claims, 3 Drawing Figures

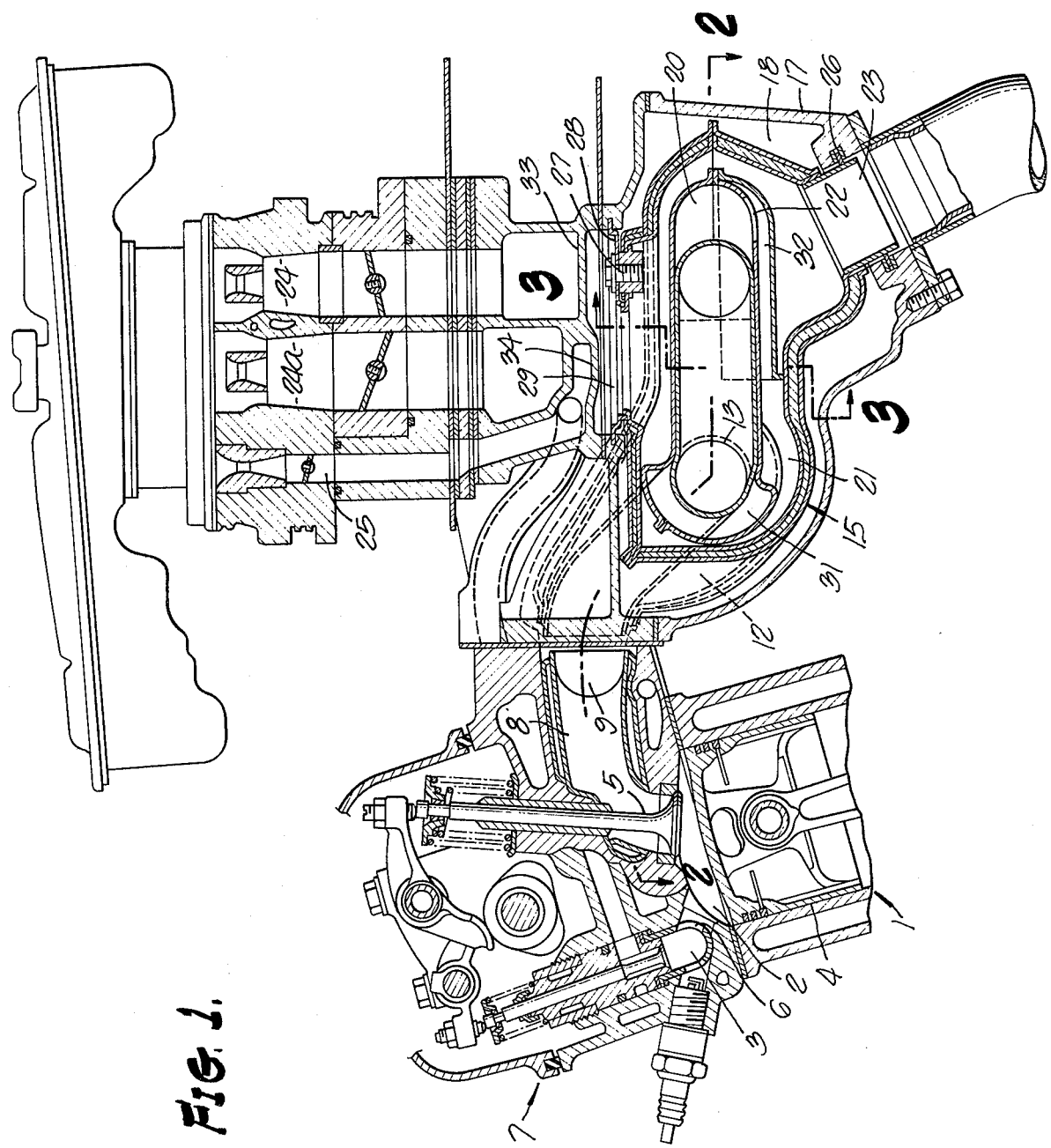

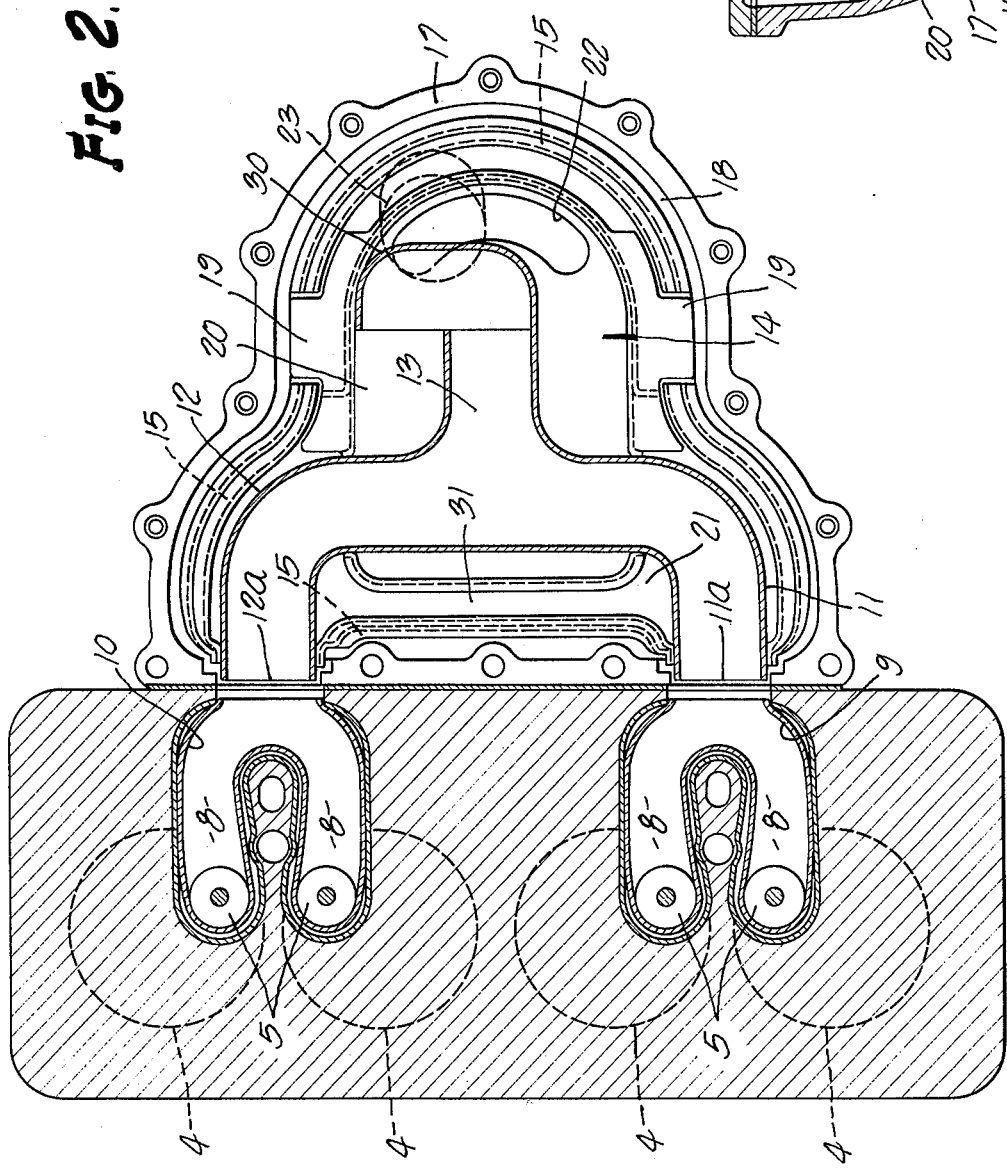
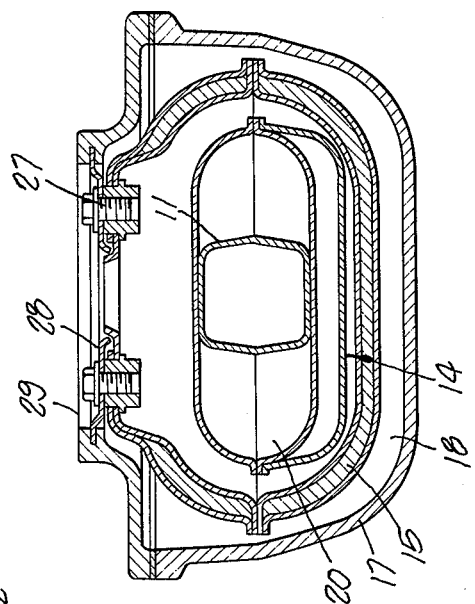

EXHAUST REACTION APPARATUS FOR MULTI-CYLINDER INTERNAL COMBUSTION ENGINE

This is a continuation, of application Ser. No. 631,046, filed Nov. 12, 1975, and now abandoned.

This invention relates to internal combustion engines and is particularly directed to improved apparatus for oxidizing HC and CO in the exhaust gases in order to minimize the quantity of these pollutants discharged into the atmosphere. The invention is particularly useful where the exhaust gases are oxygen-rich as a result of operating the engine on an overall air-fuel ratio leaner than the stoichiometric ratio. By way of illustration, this invention will be described in connection with a three-valve, prechamber, torch ignition, stratified charge engine having a plurality of cylinders.

In order to maintain temperatures of the exhaust gases at a high level, exhaust pipes each receiving exhaust gases from a plurality of cylinders of different exhaust timing are employed. These exhaust pipes merge into a single outlet which delivers exhaust gases into a first reaction chamber. The exhaust gases then pass into a second reaction chamber which surrounds and encloses the first reaction chamber and also encloses the exhaust pipes and the outlet pipe. The heat of reaction in oxidizing HC and CO also contributes to maintenance of high temperature for long residence time. In order to prevent lowering of exhaust gas temperatures by reason of expansion of the gases, the exhaust pipes, the outlet, and the continuing passageway through the first reaction chamber all have substantially the same effective cross section area.

Other and more detailed objects and advantages will appear hereinafter.

In the drawings:

FIG. 1 is a sectional elevation showing a preferred embodiment of this invention.

FIG. 2 is a sectional plan view taken substantially on the lines 2—2 as shown in FIG. 1.

FIG. 3 is a sectional elevation taken substantially on the lines 3—3 as shown in FIG. 1.

Referring to the drawings, each cylinder 4 of the internal combustion engine 1 has a main combustion chamber 2 and an auxiliary combustion chamber 3 connected by a torch opening 6. Each of the four cylinders 4 is provided with an exhaust valve 5 and these are arranged in adjacent pairs, as shown in FIG. 2. Each of these valves 5 controls the flow of exhaust gases through a passage 8 in the cylinder head 7. One pair of exhaust passages 8 discharges through exhaust port 9 and the other pair of exhaust passages 8 discharges through exhaust port 10. Each of the exhaust passages 8 is formed as a double wall pipe with air in the space between the walles, for better insulation.

An exhaust pipe 11 has an open end 11a receiving exhaust gases discharged through exhaust port 9. Similarly, exhaust pipe 12 has an open end 12a receiving exhaust gases discharged through exhaust port 10. The exhaust pipes 11 and 12 and liner 14 are each constructed of thin wall metal of good thermal conductivity. The exhaust pipes 11 and 12 are joined together to form a single and common exhaust outlet 13 at their junction, and the outlet 13 opens into the liner 14 containing a first reaction chamber 20. Both the exhaust pipes 11 and 12 and the outlet 13 leading into the first reaction chamber 20, as well as the passages through the first reaction chamber 20, are substantially equal in cross section area for substantially their entire length. In this way, any temperature drop caused by expansion of the exhaust gas is eliminated; such a disadvantage would be likely to occur if the passage size were to expand downstream from the open ends 11a and 12a. The exhaust pipes and the reaction chamber 20 are maintained at high temperature, and this is effective in accelerating the reaction of exhaust gas for minimizing air pollutants CO and HC.

Each of the exhaust pipes 11 and 12 and the liner 14 are enclosed within a double wall shell 15 having inner and outer walls with a space between them containing ceramic insulation. A second reaction chamber 21 is formed by the space between the liner 14 and the inner wall of the shell 15. These pipes 11 and 12 are heated and kept warm by heat from exhaust gases in the reaction chambers 20 and 21. A thick wall housing 17 spaced from and enclosing the double wall shell 15 provides rigidity for the assembly. The liner 14 is insulated from atmosphere by an air gap 18 between the outer wall of the double wall shell 15 and the thick wall housing 17. The liner 14 has laterally extending supports 19 received in corresponding recesses provided in the double wall shell 15. Each exhaust pipe 11 and 12 are supported by the double wall shell 15 near their respective open ends 11a and 12a. These pipes 11 and 12 are substantially prevented from being cooled by the shell 15. The double wall shell 15 has a discharge pipe 23 fixed with respect thereto and slidably mounted within a sealing assembly 26 carried on the thick wall housing 17. The double wall shell 15 is secured by means of threaded members 27 to the mounting ring 28 fixed to the housing 17 near the opening 29.

From the foregoing description it will be understood that the exhaust pipes 11 and 12 are enclosed within the double wall shell 15 and that these exhaust pipes 11 and 12 have a common outlet 13 which feeds the first reaction chamber 20 by way of reversing elbow 30. The hot gases then pass through the liner space 31, again reversing direction and emerging from the lower portion of the liner 14 through the opening 22. The exhaust gases then pass through the liner space 32 into the second reaction chamber 21 which surrounds the first reaction chamber 20. The hot gases in the second reaction chamber 21 act through the opening 29 to heat the walls 33 and 34 and then pass outward to the discharge pipe 23. The lean mixture from the main carburetor barrel 24 is heated through the wall 33 prior to introduction into the main combustion chambers 2, and the rich mixture from the auxiliary carburetor barrel 25 is heated through the wall 34 prior to introduction into the auxiliary combustion chamber 3. The secondary barrel 24a of the carburetor operates only when the engine is under heavy load condition to deliver a lean mixture to the main combustion chamber 2, but that mixture is substantially unheated.

Since exhaust gas is discharged sequentially from the cylinders 4 in a predetermined order, the junction of the exhaust pipes 11 and 12 is maintained at high temperature to accelerate the reaction of exhaust gas. Also, at any given instant exhaust gas of lower temperature existing in one of the exhaust pipes 11 or 12 is activated by exhaust gas of higher temperature flowing from the other exhaust pipe. Thus the heat of exhaust gas discharged through one exhaust pipe prevents undue loss of heat from the other exhaust pipe, because of sequential pulses of hot exhaust gases from the cylinders 4.

Also, each thin wall metal exhaust pipe 11 and 12 is surrounded by the shell 15 so that the heat of reaction resulting from oxidation of CO and HC assists in maintaining the exhaust pipes at high temperature. Furthermore, the cross section area of the continuing passageway through the exhaust pipes 11 and 12, exhaust outlet 13, reversing elbow 30, the passage including liner space 31, through the first reaction chamber 20, opening 22 and liner space 32 are substantially equal for substantially the full length of the passageway. Thus, the hot exhaust gases then pass into the second reaction chamber 21 outside the liner 14 and inside the double wall shell 15, the temperature being sufficiently high to continue rapid oxidation of CO and HC.

Having fully described our invention, it is to be understood that we are not to be limited to the details herein set forth but that our invention is of the full scope of the appended claims.

We claim:

1. For use with an internal combustion engine which discharges exhaust gases from a plurality of cylinders, the improvment comprising, in combination: a generally Y-shaped exhaust pipe having a pair of exhaust pipe sections of equal length each connected to receive exhaust gases from a pair of adjacent cylinders of different exhaust timing and an outlet section connected to receive exhaust gases from both said exhaust pipe sections, a first reaction chamber connected to receive exhaust gases from said outlet section, said first reaction chamber having a continuous passage extending therethrough, said exhaust pipe sections, outlet section and continuous passage having essentially the same cross sectional area, a second reaction chamber surrounding and enclosing said first reaction chamber and surrounding and enclosing said exhaust pipe sections and said outlet section, means for discharging exhaust gases from the first reaction chamber into the second reaction chamber, and means whereby exhaust gases are discharged from said second reaction chamber.

2. For use with an internal combustion multi-cylinder engine in which each cylinder has a main combustion chamber and an auxiliary combustion chamber connected thereto by a torch opening, and wherein a lean intake mixture is delivered to each main combustion chamber and a rich intake mixture is delivered to each auxiliary combustion chamber, the improvement comprising, in combination: a generally Y-shaped exhaust pipe having a pair of exhaust pipe sections of equal length each connected to receive exhaust gases from a pair of adjacent cylinders of different exhaust timing and an outlet section connected to receive exhaust gases from both said exhaust pipe sections, a first reaction chamber connected to receive exhaust gases from said outlet section, said first reaction chamber having a continuous passage extending therethrough, the effective cross section areas of said exhaust pipe sections, said outlet section and said continuous passage through said first reaction chamber being substantially the same, a second reaction chamber surrounding and enclosing said first reaction chamber and surrounding and enclosing said exhaust pipe sections and said outlet section, means for discharging exhaust gases from the first reaction chamber into the second reaction chamber, heat exchange means whereby hot gases in the second reaction chamber may heat the rich intake mixture for the auxiliary combustion chambers, and means whereby exhaust gases are discharged from said second reaction chamber.

3. The combination set forth in claim 2 in which the heat exchange means also heats at least a portion of the lean intake mixture.

4. The combination set forth in claim 2 in which the first reaction chamber is formed within a thin wall metal liner, and the second reaction chamber is formed within a double wall shell.

5. The combination set forth in claim 4 in which the double wall shell is enclosed within a thick wall outer housing.

* * * * *